Figure 8:
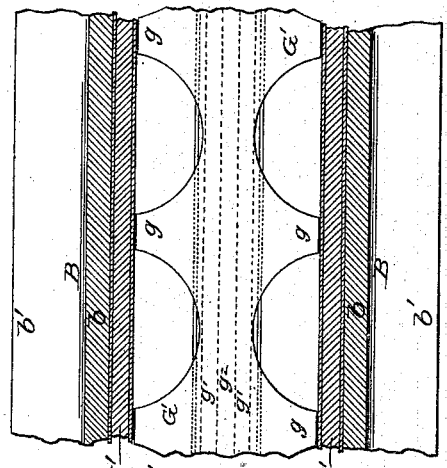

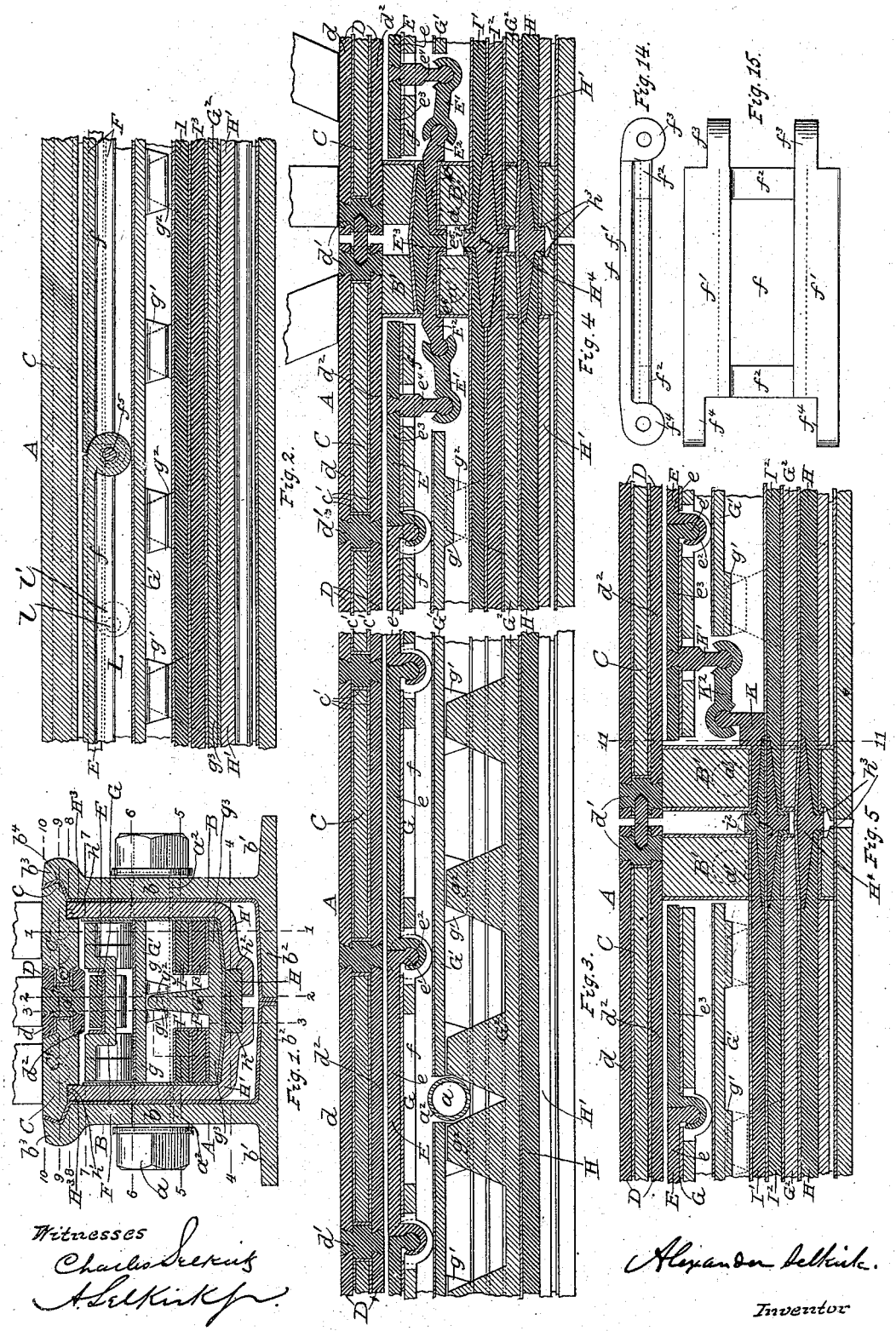

(No Model.) 3 Sheets—Sheet 2.

A. SELKIRK.
CONDUCTOR OF ELECTRICITY AND CONDUIT FOR HOLDING SAME.

No. 573,302. Patented Dec. 15, 1896.

Witnesses
Alexander Selkirk,
Inventor (No Model.) 3 Sheets—Sheet 3.
A. SELKIRK.
CONDUCTOR OF ELECTRICITY AND CONDUIT FOR HOLDING SAME.
No. 573,302. Patented Dec. 15, 1896.
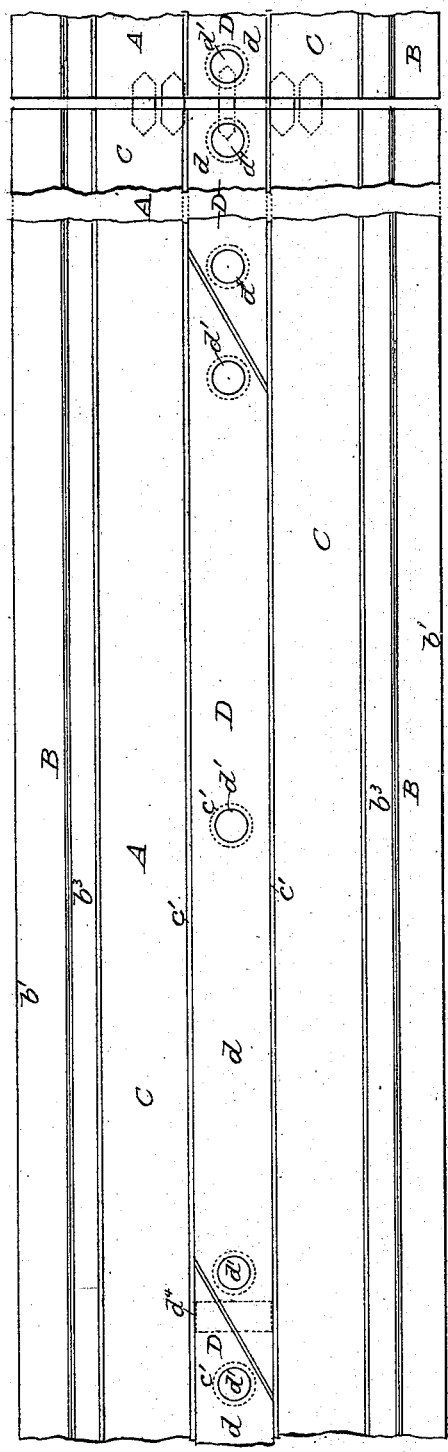
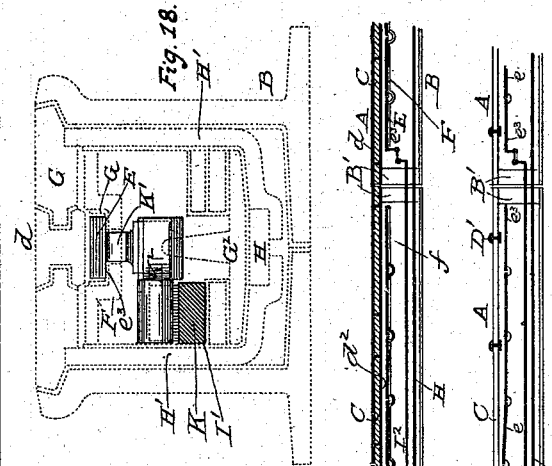
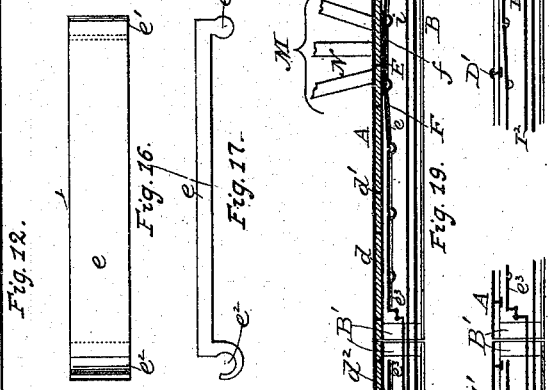
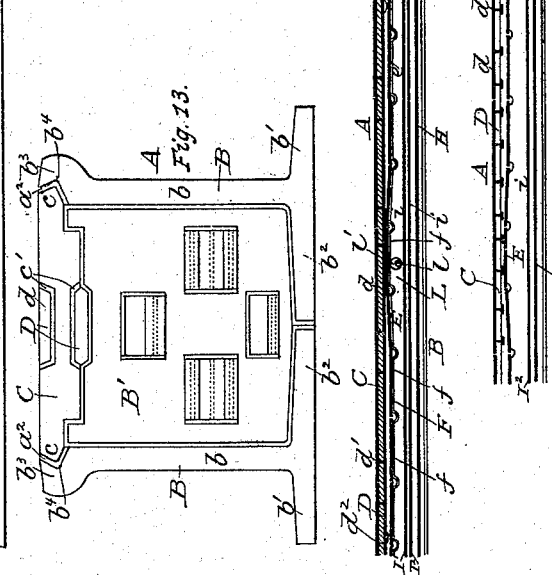
Witnesses
Charles Seevers
A. Selkirk Jr.
Alexander Selkirk.
Inventor

UNITED STATES PATENT OFFICE.

ALEXANDER SELKIRK, OF ALBANY, NEW YORK, ASSIGNOR OF ONE-HALF TO ROBERT BRYCE, OF SAME PLACE.

CONDUCTOR OF ELECTRICITY AND CONDUIT FOR HOLDING SAME.

SPECIFICATION forming part of Letters Patent No. 573,302, dated December 15, 1896.

Application filed January 30, 1896. Serial No. 577,478. (No model.)

*To all whom it may concern:*

Be it known that I, ALEXANDER SELKIRK, a citizen of the United States, residing at Albany, in the county of Albany and State of New York, have invented new and useful Improvements in Conductors of Electricity and Conduits for Holding the Same, of which the following is a specification, reference being had therein to the accompanying drawings.

My invention has reference to conductors of electricity from dynamos to other conductors leading to motors, heaters, lamps, or other devices to be operated by electricity in circuits and by distance-supply conductors at will, and also to conduits for containing distance-supply conductors and provided with means by which each distance-supply conductor may be connected at will with other conductors outside the conduit and leading to the devices to be operated.

The objects of my invention are, first, to provide a water-tight and insulating conduit for containing conductors of electricity; second, to provide a series of conduit-sections for containing conductors of electricity and means for connection of the conductors contained in each conduit-section with those of adjoining sections; third, to provide in a conduit for containing electric conductors means by which each one of several separate surface conductors may be temporarily and successively or at intervals made to serve as a medium between conductors contained within a conduit and one or more other conductors outside the conduit and communicating with a device to be operated by electricity; fourth, to provide means by which electric conductors contained within an insulating-conduit may at will be connected with outside conductors connecting with devices to be operated by electricity; fifth, to provide in a conduit sections which will insulate conductors of electricity contained within the conduit, sections which may each serve as temporary surface conductors, sections which may be magnetically affected, so as to operate as means for connection at will of conductors of electric currents within the conduit with the said temporary surface conductors; sixth, to provide with a conduit having sectional surface conductors a conductor which may serve as a live or working electric conductor and means by which it may be connected at will with any one of the sectional surface conductors; seventh, to provide with a conduit having as a part thereof sectional surface electric conductors and containing within it a live or working conductor and an insulated jointed bed supporting said live or working conductor and means for moving said bed in direction toward said surface electric conductors; eighth, to provide within a conduit having as a part thereof sectional surface electric conductors and as another part magnetic conductors and containing within it a live or working electric conductor and an insulated sectional bed of magnetic conductors which may at will be raised by a magnetic current applied by an outside magnet; ninth, to provide within an insulating-conduit having as a part thereof a series of sectional surface electric conductors and containing a jointed live or working conductor a jointed insulated bed carrying said live or working conductor and a series of distance-supply conductors which may at will be connected with the jointed live or working conductor and means by which connection may be made through said live or working conductor to each or any of the sectional surface conductors; tenth, to provide with a sectional or jointed live or working electric conductor a sectional or jointed magnetic bed for supporting said live or working conductor and calculated to be raised by magnetic operations in direction toward surface sections of magnetic conductors, which form a part of a conduit and calculated, when the sectional magnetic bed receives the magnetic current, to cause the said bed to become a working armature for carrying one or more of the sections of the electric conductor to a connection with the sectional surface electric conductor opposite and forming a part of the conduit; eleventh, to provide a series of distance-supply conductors with means for being connected each at will with sectional surface electric conductors forming a part of a conduit and which are calculated each to connect at will or at intervals with other conductors provided for conducting currents of electricity to devices to be operated, and, twelfth, to provide with a conduit having as a part thereof a series of sectional surface conductors and containing working or live electric conductors and a return or grounding electric conductor a series of sectional electric conductors, also forming a part of the conduit and calculated to return or ground the electric current from the device operated to return or ground the same, as may be required or desired. Other objects and advantages will be fully disclosed by the specification. I attain these objects by means illustrated in the accompanying drawings, forming a part of this specification, in which—

Figure 11:
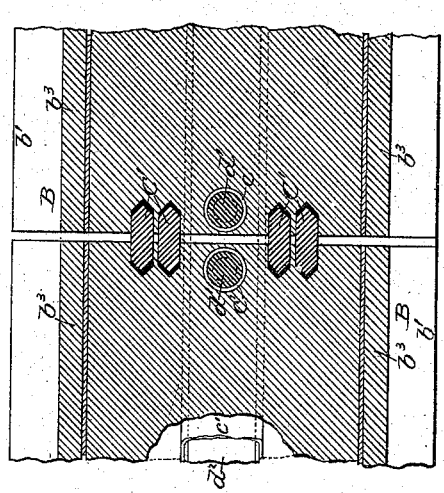
Figure 7:
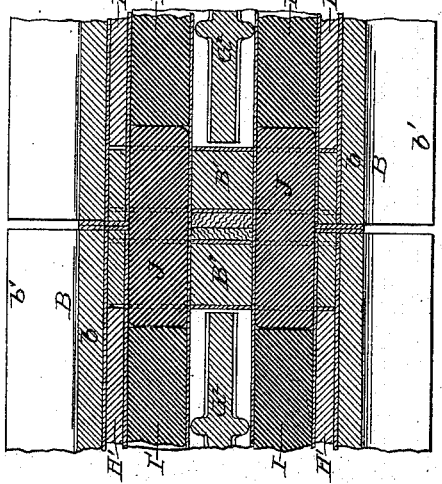
Figure 10:
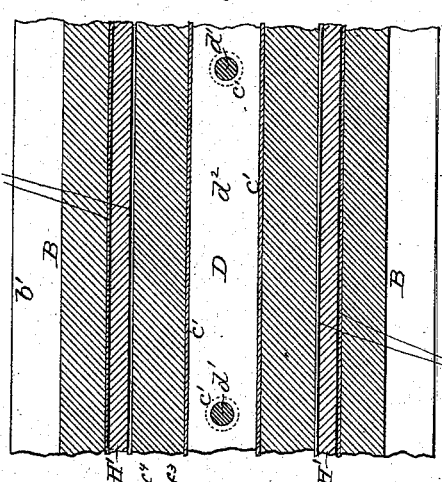
Figure 6:
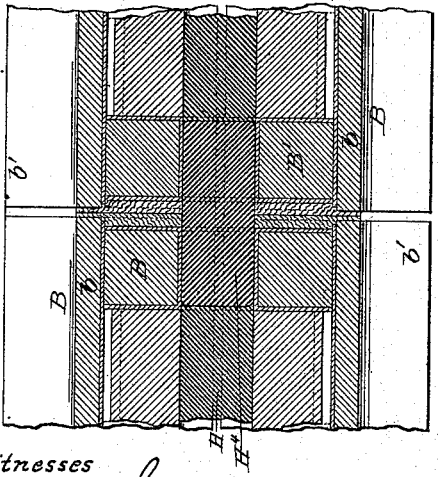
Figure 9:
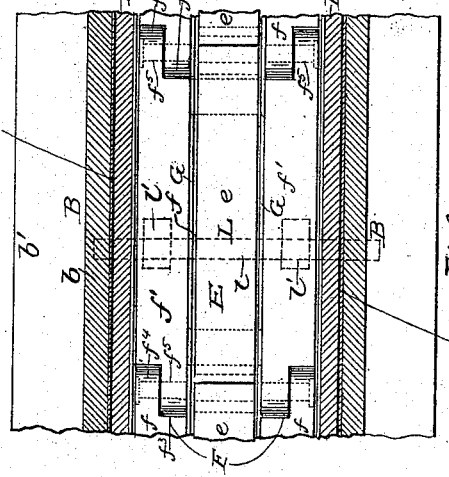

Figure 1 is a cross-section of a conduit and the devices contained therein and embodying the improvements in this invention. Fig. 2 is a vertical sectional view of the same, taken at line 1 1 in Fig. 1. Fig. 3 is a vertical sectional view taken at line 2 2 in Fig. 1. Fig. 4 is a vertical sectional view taken at line 3 3 in Fig. 1 and at the adjoining ends of two conduit-sections. Fig. 5 is a vertical sectional view taken at line 3 3 in Fig. 1 and at the adjoining ends of two conduit-sections and illustrating the connection of distance-supply conductors with sectional or jointed conductors. Fig. 6 is a horizontal sectional view taken at line 4 4 in Fig. 1. Fig. 7 is a horizontal sectional view taken at line 5 5 in Fig. 1. Fig. 8 is a horizontal sectional view taken at line 6 6 in Fig. 1. Fig. 9 is a horizontal sectional view taken at line 7 7 in Fig. 1. Fig. 10 is a horizontal sectional view taken at line 8 8 in Fig. 1. Fig. 11 is a horizontal sectional view taken at line 9 9 in Fig. 1. Fig. 12 is a horizontal view taken at line 10 10 in Fig. 1. Fig. 13 is an end view of a conduit. Fig. 14 is a side elevation of a section or link of a jointed-conductor supporting-bed. Fig. 15 is a plan view of the same. Fig. 16 is a plan view of a section or link of a jointed live or working conductor. Fig. 17 is a side elevation of the same. Fig. 18 is a view illustrating the connection of a distance-supply conductor with a jointed conductor and taken at line 11 in Fig. 5. Fig. 19 is a diagram illustrating the peculiar general features in this invention. Fig. 20 is a diagram showing a modification, and Fig. 21 shows another modification.

In the drawings the several letters of reference refer to similar parts throughout the several views.

In the drawings, A is a conduit embodying in its construction certain parts and elements and containing the several devices hereinafter fully described. This conduit A is a duplicate of the other conduits in a conduit-line, which may be arranged between any two points at any preferred distance apart. This conduit may be made with any advantageous length, and preferably of length of thirty feet, or more or less, and is of dimensions in its cross area suitable to give it capacity for containing any preferred number of electric conductors, both working and distance-supply conductors, as may be required or be found to be necessary for advantageous service in the circuits to be formed for operating motors, heaters, lamps, telegraphic or telephone apparatuses, or other devices by means of electricity to be supplied from any convenient source of supply through the several conductors or any preferred number of the same contained within the conduit. This conduit is shown in Figs. 1, 6, 7, 12, 13, and 19, all taken in connection, to be composed of the two side rail-like sections B B, top portion C, and end-closing devices B' B', all insulated as may be required and having the joints of said parts suitably packed and made water-tight, and having said sections or parts securely held together by a suitable number of bolts, as $a$, between the end-closing devices B' and the plug or other screws or bolts, as $a'$, applied for holding said sections B B secured to the end-closing devices B', with packing between for making water-tight joints. The side sections B of this conduit may be made by any known rolling process from iron or steel and with lengths of thirty feet, or more or less, and is provided with vertical side portions $b$, base portions $b'$ $b^2$, and undercut upper edge portions $b^3$, as shown in Figs. 1 and 13. Although the top portion C of this conduit may be made of a single piece of rolled or cast metal, with length equal to that of the side sections B, yet I at present prefer to form said top portion of sections of from ten to fifteen inches, more or less, in length, and with the several sections of like width and thickness and in correspondence of detail, which may be readily produced by rolling process from suitable metals. The side edges of the top portions C are made with bevels $c$, holding with the undercut top edge portion $b^4$ of the side sections B, with insulating-packing between at the joints.

When the conduit is to contain a working conductor calculated to be connected with a surface conductor by mechanical means, as will be hereinafter described, the top portion C may be made of iron or steel, with length equal to that of the side sections B, while when the connection of the working conductors within the conduit with the surface conductors is to be made by magnetic force the top portions C are to be made of suitable metal, but preferably of iron or steel and with short lengths, or of such lengths that the opposite ends of a magnet or magnetic brush may be in magnetic connection with two adjoining top portions or sections C at the same time, instead of with a single piece or section.

When the working conductor within the conduit is to be brought in electrical connection with the surface conductors by means of magnetic force, I preferably provide at the ends of two adjoining conduits A A, as illustrated in Figs. 11 and 12, short sections C C and connect them by dowels C' of soft iron or steel, so that said short sections of two adjoining conduits may be magnetically connected, as shown in Fig. 11.

The metal pieces comprising the top portions C of the conduits A have secured to them by suitable means surface electric conductors in any desired number, and each of suitable size for giving to it such capacity for transmitting electric currents as may be found to be advantageous for practical purposes. Although but one surface electric conductor D, Figs. 1 and 12, of comparatively large cross area is shown to be in the entire width of the top portion C, yet they may be increased in number, while the said top portions C may be made with any suitable width, so as to receive any preferred number of surface conductors as may be desired for use for connection with outside electrical conductors, however such connections may be made.

The electrical conductors, provided with the sections or portions C of the conduit, for service as service-conductors may be of any suitable form and may consist of a series of vertical pins, as $D'$, Fig. 21, and made of copper or other metal of good conductivity, yet I prefer to form the said surface conductors of one or more strips of metal of good conductivity, arranged lengthwise with the top sections C and secured therewith by suitable rivets or pins of metal, also of good conductivity. Single longitudinal strips, as $d$, may be arranged on the upper sides of sections C and be secured in place by rivets $d'$, having their heads projecting from the opposite side, as in Fig. 20, or this arrangement of a single strip and rivets may be reversed.

The drawings generally illustrate but one surface conductor provided in the width of the sections or portions C of the conduit, and also show the same to comprise the upper side conductor-strip $d$, lower side conductor-strip $d^2$, and rivets $d'$, securing said strips with the sections C, as shown in Figs. 1, 3, and 4. When the sections or portions C of the conduit are made with short lengths and are intended to serve as media by which magnetic currents may pass to devices serving as armatures within the conduit, the joints between the ends of each two adjoining sections or portions C will be insulated and made water-tight by means of any suitable insulating packing substance within the joints between the conductor-strips $d$ $d^2$ and rivets $d'$ and $d'$, and the substance of sections C are also packed by suitable insulating packing substance $c'$, Figs. 1, 3, 4, 10, 11, and 12, and the joints between the adjoining ends of the said conductor-strips are also packed by similar insulating substance $c'$, Figs. 4, 5, and 12.

When the electric current from the live or working conductors within the conduit is to be communicated to stationary outside conductors, the ends of each of the conductor-strips of the surface conductors D may be at right angles with the side edges of said pieces, yet when the outside conductors to be employed with the surface conductors are of a running or moving character I prefer to form such end edges with lines which are relatively oblique, as shown in Fig. 12, so that the receiving end (or return end) of such outside conductors may have an electrical connection with two adjoining surface conductors, as at places substantially as indicated by dotted lines $d^4$ in Fig. 12.

Although the drawings show the surface conductors D to be of such dimensions in their cross areas as to give them capacity suitable for service in supplying electric currents to car-motors or locomotives for driving the same, yet these surface conductors may be of such smaller dimensions in cross area as may adapt them for service in supplying electric currents to outside conductors connecting with motors of small power or with lamps, heaters, telegraph or telephone apparatuses, or other devices arranged on circuits and intended to be operated by electricity from live or working conductors contained within the conduit.

E is a jointed live or working electric conductor suitably supported on a flexible bed arranged within the conduit A and having its upper surface, when in normal condition, at a short distance below the lower side surfaces of the surface conductors D, whether such lower side surfaces be those of the heads of rivets or pins $d'$ or strips $d^2$ or surfaces of devices of other forms and serving as surface conductors in the conduit. These jointed live or working conductors in each conduit are connected each by their respective ends with those in the adjoining conduits, and this connection may be made by any suitable means in any suitable manner, so as to make a perfect electrically-connected line of live working conductors throughout the aggregated lengths of the many conduits containing these jointed conductors E.

Although the jointed conductor E may be of any preferred form of construction, yet I at this present time prefer to form it of sections $e$ $e$, each having electrical connection with the other by any suitable means which may be calculated to allow each section $e$ to be carried against the surface of the surface conductors D or part thereof opposite.

My present preferred form of sections $e$ of this jointed conductor E is shown singly in plan view in Fig. 16 and in side elevation in Fig. 17 and in connection with each other in Figs. 2, 3, and 9. In this preferred form of sections $e$ $e$ in all their portions they are each a duplicate of the other in dimensions and forms of parts and have their bodies in the form of flat plain pieces of metal of good electrical conductivity and having integral with one end a cross-arranged pintle $e'$ and with its opposite end a corresponding pintle-receiver $e^2$, having its concavity in correspondence with the convexity of the pintle $e'$, so that the pintle $e'$ in each section $e$ may nicely fit into the receiver $e^2$ and securely hold therewith with their surfaces in contact suitably for making a perfect electrical connection with each other. These sections $e$ may be produced from copper or other suitable metal and be readily joined together by simply holding one end of pintle $e'$ of one section at the open end of the pintle-receiver $e^2$ of the section to be joined, and then moving one of said sections relatively sidewise to carry the pintle $e'$ to enter into the pintle-receiver $e^2$, as shown in Fig. 3, when the sections will be united, as shown in Figs. 3 and 9, and each section in this jointed conductor will be free to articulate from joints electrically connecting said sections.

The jointed conductor in each conduit A of the conduit-line has a suitable connection by its ends with the ends of the adjoining conductors, which connections may be made in any suitable manner and by any kind of devices calculated to allow the conduits with their contents to be joined or separated at will, and when joined to electrically connect the adjoining ends of these jointed conductors and thereby produce a continuous live or working conductor of any preferred or advantageous length, as from lengths of only that of a few conduits A to that of ten miles, more or less, as may be required for operations contemplated. At present I prefer to employ devices shown in Fig. 4 for effecting the joining of the ends of these jointed conductors E in each conduit with those of the adjoining ones. In this preferred means $e^3$ $e^3$, Fig. 4, are terminal sections in the jointed conductors contained in two adjoining conduits, which terminal sections $e^3$ are each jointed with its adjoining section $e$ and extends from the latter toward the end-closing piece B' of conduit A to within a short distance from the same. Depending from the terminal section $e^3$ in each conductor is a pintle-bracket $e^4$, which is flexibly connected by connecting-piece E' with the end anchor-piece $E^2$, holding with said end-closing piece B' after passing through the same by shoulders $e^5$ $e^6$.

$E^3$ is a keying-piece for securely holding the anchor-pieces $E^2$ $E^2$ with the respective end-closing pieces B' B' they pass through, and also for making an electrical connection between said anchor-pieces, as shown. This keying-piece is preferably made with duplicate wedge-shaped portions or halves and has its exposed portions properly insulated, as shown in Fig. 4, and provided with middle stop. These terminal sections $e^3$, pintle-brackets $e^4$, connecting-pieces E', anchor-pieces $E^2$, and keying-piece $E^3$ are made of metal of good conductivity, preferably of copper, and a suitable non-conducting packing material between the metal of the end-closing pieces B' and anchor-pieces, and their keying-pieces insulate the two latter.

When conduits A A are to be laid and joined for service, they are placed end to end, with the keying-piece $E^3$ inserted in its place between the anchor-piece of the laid conduit (preferably) and the end-closing piece B', when the end of the conduit to be joined with that of the already-laid conduit will be moved endwise and so guided that the opening receiving the anchor-piece of the laid conduit may receive the outer projecting tapering portion of the same keying-piece, all as shown in Fig. 4, when a suitable electrical connection will be made between the jointed conductors of the joined conduits. Similar means and similar methods of procedure may be employed for joining the jointed conductors of each of the several conduits in the conduit-line with those in their adjoining ones.

F is a jointed bed for supporting the flexible conductor E, which bed is preferably made of sections $ff$ (shown in detail in Figs. 14 and 15) and joined as shown in Figs. 1, 2, 3, and 9, although these sections $ff$ may be made with any suitable form of construction which may adapt them to support the several sections $e$ $e$ of the working conductor E uniformly at the same distance below the lower side surfaces of the surface conductors D and prevent said sections $e$ from shifting sidewise and also adapt this bed F to be readily moved in its sections $f$ in direction toward the surface conductors D for carrying the sections $e$ of conductor E to an electrical connection with the surface conductors, as may be required for making electrical connections with outside conductors, yet the form of sections $f$ shown in Figs. 1, 2, 9, 14, and 15 I at present consider advantageous, as they each require but little metal and may be cheaply produced from iron and be readily joined together in the conduit not only for service as a supporting-bed, but also for service as armatures to be magnetically affected and operated. In the drawings these sections $ff$ are shown to be each a duplicate of the others and having side portions $f'$ $f'$, constituting the body of the section, and webs $f^2$ $f^2$, connecting said side portions on a plane above said webs, as shown in Figs. 1 and 14, so as to guard the sections $e$ $e$ of the conductor E from shifting laterally, and knuckles $f^3$ $f^3$ and $f^4$ $f^4$ centrally perforated and receiving the pivot-pins $f^5$ $f^5$, Figs. 2 and 9. These sections $ff$ of the jointed bed F are preferably made of cast-iron and with a length between the centers of the pivots $f^5$ corresponding with the lengths of sections $e$ $e$ of the conductor E between their centers of joints, and when made of iron they constitute the sections of a jointed armature which is adapted to be drawn by magnetic force toward the sections C of the conduit when a magnet M is applied to the same, as illustrated in Fig. 19, the arms of a magnet being shown.

G is a suitable insulating material between the sections $f$ of the jointed bed F and sections $e$ of the jointed conductor E, which insulating material is preferably secured by means of cement to those surfaces of sections $f$ which may be opposite those in sections $e$ which the former support. The sections $e$ of the conductor E are so arranged in relation to section $f$ of the bed F and the lower surfaces of the top portions or pieces C of the conduit that the plane of the upper surfaces of the former may be made to have a bearing against the lower side surfaces of the surface conductors D when the sections $f$ of the bed F are raised to a distance to about or nearly touching the lower side surfaces of the top portions C of the conduit, as indicated by dotted lines in Figs. 1 and 3, whereby the sections of the flexible bed F may not prevent the sections of the conductor E from having electrical connection with the surface conductors D when the sections of said flexible bed are raised by any means which may be selected to be employed. This jointed bed F is made with a length corresponding with that of the working conductor E, supported by it, so as to extend the whole length of the chamber of the conduit, the same as said conductor, with the terminal sections $f$ at each end, Fig. 4, ending at a short distance from the end-closing piece B' of the conduit. This bed F is preferably supported within the chamber of the conduit at such a distance from the pieces C, forming the top portions of the conduit, as may be found to be advantageous for suitably supporting the working conductor E at such a distance from the surface conductor D above that no electrical communication may be had between the said working conductor and surface conductor when the jointed bed is in normal or unraised situation, as shown by full lines in Figs. 1 and 3, and any suitable means may be employed for giving to this jointed bed such support, yet I at present prefer to employ stationary supporting-pieces G' G', Figs. 1, 3, and 8, each of any preferred length and supported by a second stationary piece $G^2$. The stationary supporting-pieces G' are preferably made of metal, with open-work form, as illustrated in Fig. 8, for reduction of weight of the metal in the pieces. These pieces G' are each of sufficient width between their side edges $g$ $g$ to extend across the chamber of the conduit and have bearing against some stationary side wall, as shown in Figs. 1 and 8, for preventing said pieces G moving laterally in either direction. Parallel flanges $g'$ $g'$, provided at intervals with the lower sides of these pieces G' and at short distances apart, receive between them the upper end portions of the limbs $g^2$ $g^2$, provided with the base portions $g^3$ of the pieces $G^2$, which may be made of cast metal and with any preferred length. These pieces $G^2$ may be supported by its base portions $g^3$ from any suitable surface or surfaces provided within the chamber of the conduit. When the conduit does not contain below the base portions $g^3$ of pieces $G^2$ any other devices, the said base portions $g^3$ may rest on the base limb portions $b^2$ of the side sections B of the conduit, with their outer edges abutting against the vertical side portions $b$ of the said side sections B; but in case there is contained within the conduit a return-conductor and devices for conducting electric currents to the latter I prefer to locate such return-conductors below the supporting-pieces $G^2$ and support the latter from the return conductor or conductors and suitable adjuncts of the same or other devices which may be in the lower portion of the chamber of the conduit.

H, Figs. 1, 3, 4, 5, and 6, is a return-conductor for returning the electric current to the dynamo or to a suitable place for grounding the current after operating motors, lamps, or other devices. This return-conductor H may be of any metal of good conductivity and be of any form and size to give it such capacity as may be found to be necessary for advantageous operations.

The return-current from a motor or several motors or other devices on a circuit may be conducted to the return-conductor H through any suitable agency, also contained within the conduit, by which the electric current, after operating with the devices on the circuit, may be readily conducted with but little resistance from an outside return-conductor to said interior return-conductor H, yet I at present prefer for general use to employ side electric conductors H', one or more, Figs. 1, 3, 4, 5, 6, 9, and 10, between the plates or pieces comprising the top portions C of the conduit and the return-conductor H, which side electric conductor may be of any material calculated to readily take from the plates or pieces of the top portion C of the conduit the electric current and turn it to the conductor through which it may have passage to a place of preferred discharge. The side electric conductors H' may be of cast or wrought iron or soft steel and be made in sections of any preferred length and having any suitable form of cross area as may be found to be advantageous for connection of the portions C of the conduit with the return-conductor H and for being retained in place within the conduit and for affording place for other devices which may be contained within the chamber of the conduit. They are shown to be made in cross area with an angular form and each held securely clamped from moving by the operations of the side portions B of the conduit against the outer sides of their vertical sides, while the return-conductor H, between the clamping edges of their horizontal portions, receive and resist the clamping-pressure of the said side portions B of the conduit. At the same time shoulders $c$, provided with the pieces C of the top portion of the conduit, resist the clamping-pressure against the upper margin of these side electric conductors, while bolts $a$ at suitable intervals are preferably employed for forcing the side pieces B B of the conduit against each other and the margin edges of pieces C of said conduit and the said side electric conductors H' H'. The surfaces of the edges $h'$ and side margins neighboring said edges of these side electric conductors H' H' and the surfaces of the portions $h^2$, clamping the return-conductor H, when of iron or steel, are cleaned of all foreign substances and are preferably coated with copper, and the metal of the conductor H is held clamped in contact with the surfaces of the portions $h^2$, so as to have an electrical connection with the same, while a thin strip or strips of copper H³, Figs. 1, 9, and 10, are interposed between the surfaces of shoulders $c$ of pieces C of the conduit and the surfaces of edges $h'$ and their side margins for making a good electrical connection between the pieces C of the conduit and pieces forming the side electric conductors H' H'. The clamping-bolts $a$ are also insulated by any suitable insulating material $a^2$, as shown by full lines in Fig. 3 and indicated by dotted lines in Fig. 1.

The return-conductor H in each conduit is preferably made to consist of a single strip of copper extended full length of the conduit and continuously held by the edge clamping portions $h^2 h^2$ of devices H' H', and have their ends secured by lips $h^3$, Figs. 4 and 5, turned against the end-closing pieces B' after passing through the same, and an electrical connection is made between the adjoining ends of these return-conductors H, contained in adjoining conduits, by means of suitable keying-pieces H⁴, Figs. 4, 5, and 6. These end portions of conductors H, passing through the perforations provided in the end-closing pieces B' and the keying-pieces H⁴, of good conductivity, are insulated by any suitable insulating substance, as in Figs. 4, 5, and 6.

I I' I² I³ are distance-supply conductors for services as live conductors to the flexible working conductors at points distant from the source of electricity, which distance-supply conductors may be arranged in lines of any preferred number within the conduits A of the conduit-line. These distance-supply lines of conductors extend each to any preferred distance in the conduit-line, and each distance-supply conductor is preferably comprised by a series of sections $i\ i$, of metal of good conductivity, preferably copper, and each of length equal to the length of the conduits receiving the same, which sections are each suitably insulated by any suitable insulating material $i'$, as shown in Figs. 1, 2, 4, 5, and 6, and have their end portions passed through perforations provided in the end-closing pieces B', and secured, preferably, by their turned end lips $i^2$. Keying-pieces J, Figs. 4, 5, and 6, preferably of copper, electrically connect the adjoining ends of the sections $i\ i$ with those of the adjoining sections in the same relay-line. These lines of distance-supply conductors extend from their source or sources of the electric currents to points at which they are respectively connected with the jointed working-conductor lines in the conduit-line, as illustrated. With these distance-supply conductor-lines in the conduit-line I prefer to provide as many separate and distinct lines of connected working jointed conductors E (besides the first line of jointed working conductors nearest the source of electric current) as there are distance-supply lines I I' and $c$ in the entire conduit-line, and successively connect with each succeeding jointed working line after the first in the conduit-line one of each of the several distance-supply conductor-lines in regular order, substantially as illustrated in Figs 5 and 19, in which the sectional features of the respective lines are omitted from the illustration.

Although the electrical connection of each of these distance-supply conductors with the respective jointed working-conductor lines may be made by means of any suitable devices selected to be employed for that purpose, yet I at present prefer to make such connections by means of an anchor-piece K, bracket K', connected with section $e^3$ of the jointed conductor, and the linking-piece K². In these devices the anchor-piece K, made of metal of good conductivity, holds with the end-closing piece B' of the conduit, which contains the jointed working conductor E in the line the distance-supply conductor is to connect with, which anchor-piece is electrically connected with the terminal end of the distance-supply conductor, say, as I, by the keying-piece J, (shown in Fig. 5,) while the linking-piece K² forms a joint connection with the anchor-piece K and bracket K', Fig. 5, and indicated by dotted lines in Fig. 7.

Substantially similar means are preferably employed for electrically connecting each relay-line conductor with its preferred coacting line of jointed working conductors at such points in the entire length of the conduit-line where connections may be required to be made. With these distance-supply conductors in service in the conduit-line the first length of line of connected jointed working conductors E, commencing at the conduit-terminal nearest the source of electricity, may be in length of from one or less miles to ten or twenty miles or more, as may be found to be advantageous for best results, and each successive jointed working-conductor line may be made with other or similar lengths, as may be required or preferred by the service designed to be had. The first relay-conductor line, as I, will run from its source of electricity to the first section $e^3$ of the second jointed working conductor in the circuit, as illustrated in Fig. 19, whether it be one mile or less or twenty miles, more or less, in length. The second distance-supply conductor-line, as I', will run from its source of electricity to the first section $e^3$ of the next or third jointed working-conductor line in the conduit, whether it be one or twenty miles or more or less in length. The third distance-supply conductor-line, as I², will run from its source of electricity to the next or fourth jointed working-conductor line in the conduit, whatever its length may be, and so on. Each of the other distance-supply conductor-lines is to be successively connected each to its respective jointed working-conductor lines in the conduit-line until all the jointed working-conductor lines in the conduit are provided each with its own distance-supply conductor-line for its uninterrupted supply of electric current.

In operation each of these distance-supply conductors serves as a means for supplying electric currents from their sources without any resistance whatever from motors, lamps, or other apparatuses or devices which may be operated by electric currents through the other lines of jointed working conductors in the conduit-line, while in a conduit five miles or less to one five hundred miles, less or more, in length the several lines of jointed working conductors may each be supplied with electric currents for operating each a particular circuit from one mile or less to twenty miles or more in length, and thereby by combining in a conduit-line from one to fifty or less or more distance-supply conductor-lines and lines of jointed working conductors in corresponding number plus one electrical currents may be taken from one preferred or advantageous place of supply for operating simultaneously many circuits of great length or different lengths with those conductors more distant from the same advantageous source or place of supply, receiving about an equal or differing currents as may be preferred or required for services for operating motors, lamps, or other apparatuses to be electrically operated. This conduit may be increased in dimensions and be made in cross area of its chamber for containing conductors of either large or small capacity, and such number as may be preferred in the service to be had or circuits to be established and maintained.

Although but a single jointed conductor and a single series of surface conductors are shown to be employed in the conduit, yet any preferred number of such series and corresponding jointed conductors may be employed, and magnetic devices or mechanical means may, as may be preferred, be employed for making an electrical connection at will of the jointed conductors with any of the series of the surface conductors.

When the sections $ff$ of the jointed bed F are to be moved toward the sections C of the conduit for carrying one or more sections $e$ of the jointed working conductor E into electrical connection with the surface conductors D, by means of magnetic force, I would employ a magnet of any suitable form of construction and of proper strength, which might be adapted to effect the operations to be had. This magnet may be either an electromagnet or a permanent magnet, as M, Fig. 19, (the arms thereof shown.) The magnets M, whether stationary in character (for use in a switching mechanism for cutting out a local current for a local or shunt circuit) or for use in a traveling switching mechanism (for progressively cutting out a current for driving a motor of a railway-truck or for use for returning the current by the way of a return-circuit line conductor,) are applied to the top sections C of the conduit, when the magnetic current will pass in a circuit, governed by the polarity of the magnet, through two adjoining sections C, as before stated, and act with magnetic force with the jointed sections $ff$ of the bed F (which jointed sections in such a case will be a jointed armature) and draw by magnetic force said sections $f$ toward the poles of the magnet and thereby carry section $e$ of the jointed working conductor E, which may be supported on sections $f$, into electrical connection with the surface conductors D, so that when any suitable electrical conductor, as N, Fig. 19, shown to be exterior to the conduit A and relatively between the poles of the said magnet M, is placed into electrical connection with the surface conductors D an electric current may be cut out from the jointed working conductor E and be conducted by any suitable conductor to any selected place or device where the current is to be used.

Although any suitable known mechanical device which is adapted to raise a section $f$ of the jointed bed F toward the top sections C of the conduit may be employed for moving any one or more of said sections $f$ of said jointed bed (having the jointed sections of the working conductor thereon) toward the sections C above, yet at the present time I preferably employ as a mechanical device for such purpose a suitable cam-shaft L, Figs. 2, 9, and 19, which cam-shaft L has with its shaft portion $l$ cams $l'$ $l'$, which latter are preferably arranged beneath the said portions $f'$ $f'$ of any selected one or more of the sections $f$ of said jointed bed F, as shown by full lines in Fig. 19 and indicated by dotted lines in Figs. 2 and 9, while the end portions of the shaft $l$ of the cam-shaft have bearings in the side sections of the conduit, with an end portion extended outward therefrom to a suitable distance for convenience of being turned by means of any suitable instrument. When this cam-shaft L is turned from position of dotted lines in Fig. 2 to that of full lines in Fig. 19, the cams $l'$ $l'$ will carry the section $f$ of the jointed bed F and the section $e$ of the working conductor E thereon toward the section C of the conduit and tightly press the section $e$, supported by section $f$, against which the cams $l'$ $l'$ of the cam-shaft L bear, into electrical connection with the surface conductor D of the conduit, so that, at will, any suitable exteriorly-applied electric conductor (not shown) may be readily applied to the surface conductor D, the same as when a magnet is employed, as above described, for carrying a section $f$ of bed F toward the sections C of the conduit, for moving section $e$ of conductor E into electrical connection with the surface conductor D, adjoining thereto, and for similar purposes.

In some cases, as when the conduit-line is to be short or short circuits are to be formed, the distant-supply conductors may be omitted, while in long circuits, or when several kinds of services are to be maintained, as, say, for driving motors of street or other cars, stationary motors in shops or factories, for operating incandescent lamps or arc-lights and apparatuses for warming or other purposes, they may be increased in number and be of various sizes or capacities, as may be found to be advantageous. The conduit may be so constructed in its parts and be provided with surface, jointed, or distant-supply conductors of different sizes and capacity, as may be found to be advantageous in the several classes of services to be obtained by electric currents controlled and directed at will to operate different apparatuses and devices at the same or different times. The increasing or lessening the capacity of the conduit and the number and capacities of the several classes of conductors, including the return or grounding conductors, may be readily accomplished solely by the exercise of ordinary judgment and skill for effecting such modifications as the services of the conduits and the circuits may require. These conduits, with all their external and internal appliances or members, parts, and devices, may be produced in factories and be transported, stored, handled, and laid as readily as ordinary rails without any parts or portions becoming deranged, and when laid be water-tight, with all joints and the keying devices so insulated that loss of electric energy will be prevented by way of ground passage or atmospheric attraction or conduction.

Having described my invention, what I claim, and desire to secure by Letters Patent, is—

1. In an electric conduit, the combination with two metallic rail-form side pieces of equal length and having each a horizontal base portion which is joined with the other, a water-resisting packing between the said joined portions of said side pieces, an end-closing piece at each terminal of said joined rail-form side pieces and secured between the same and having in them longitudinal perforations which are adapted to permit the passage of terminal portions of electric conductors from within to without said conduit, and a water-resisting packing between the edges of said end-closing pieces and the portions of the said rail-form side pieces, of a series of metal sections closing the longitudinal opening between the unjoined edge margins of the said two rail-form side pieces and adapted to receive on their exterior sides electric conductors for connection with a working conductor contained within the conduit, water-resisting packing between the abutting ends of said metal sections and between the edges of the same and the portions of said rail-form side pieces at which the edges of said sections join, and devices adapted to force the surfaces of the joined portions of the respective pieces toward each other and tightly against the water-resisting packing between, substantially as and for the purposes set forth.

2. In an electric conduit, the combination with two metallic parallel rail-form sections of equal length and having each a horizontal base portion extended inwardly for joint with the other, end-closing pieces provided with horizontal perforations calculated to admit the passage of electric conductors, from within the conduit, endwise out from the same, a series of metallic sections having thin lateral edges holding with the upper edge margins of said rail-form sections, and insulating packing material between surfaces at the joints of the several parts or sections in the conduit, of a series of short surface conductors of metal of good conductivity, suitably insulated at their joints with each other and the sections of the top portion of the conduit they are secured to, and calculated to a current of electricity from a conductor within the conduit to one outside and the reverse substantially as set forth.

3. In an electric conduit, the combination with metal rail-form parts or sections of equal length and calculated to comprise the side and bottom portions of the conduit, end-closing pieces provided with perforations which admit through them the passage of end portions of conductors of electric currents, and packing material in the joints of said parts or sections and said end-closing pieces, of a series of pieces of metal joined with each other and holding with the upper edge margins of the side portions or parts of the conduit and comprising the top portion of the latter, packing material in the joints between said pieces, comprising the top portion of the conduit, and in the joints between the parts of the top portion of the conduit and the side parts of the same, and devices which are calculated to hold all the metal parts of the conduit securely together and joined in a water-tight manner, substantially as and for the purposes set forth.

4. In an electric conduit comprising metal sides, bottom and end-closing pieces joined together with packing material between producing water-tight joints, and having openings through said end-closing pieces for passage of the end portions of conductors contained within the conduit, the combination with the same of a series of metal pieces arranged adjoining each other and holding with the side pieces of the conduit and forming the top portion of the latter, and packing material between the joints of said top pieces and said side pieces, they hold with, calculated to make water-tight joints between the same and metal pieces of good conductivity secured to said top pieces and insulated from contact with the metal of the latter and calculated each to serve as a conductor of electric currents from a conductor within the conduit to one outside the same, substantially as and for the purposes set forth.

5. In an electric conduit, the combination with two angular rail-form pieces which constitute the sides and bottom of the conduit, metal end-closing pieces at the terminals of said rail-form pieces, water-resisting packing in the joints of said pieces with each other and said end-closing pieces, openings having their side surfaces insulated and passing through said metal end-closing pieces in direction of the length of the conduit, and adapted, one, to admit the passage of an end portion of an interior working conductor, and another, for the passage of an end portion of a return-conductor, a metal closing top wall extending the entire length of the rail-form pieces and joined with the same and the upper edges of said end-closing pieces, and a water-resisting packing between the joints of said top wall and the pieces it joins with, of a series of short surface conductors on the outer side of the closing top wall, insulating-packing between said surface conductors and said top wall, and devices of metal of good conductivity applied to the inner side of said metal top-closing wall with insulating-packing between and having connection with the surface conductors on the outer side of said top wall, substantially as and for the purposes set forth.

6. In an electric conduit combining rail-form pieces of equal length, which comprise the side walls and bottom of the conduit, and metal end-closing devices which are perforated in direction of the length of the conduit and have their sides insulated for receiving electric conductors, the joints of the rail-form pieces and end-closing devices being packed with a water-tight resisting packing, a top-closing wall comprising a series of short metal pieces through which magnetic currents may freely pass from a magnet to an armature and return, and water-resisting packing between the abutting ends of said short metal pieces and between their edges and the rail-form pieces they join with, of a series of short electric conductors which are insulated on their lower sides and edges and permanently held in place with the upper sides of said short metal pieces of the top-closing wall, electric conductors applied to the lower sides of said short metal pieces with insulating-packing between and permanently secured with the short electric conductors on the upper sides of said short pieces of the top-closing wall, and a water-resisting and insulating surface covering which is applied to the inner surfaces of all the pieces comprising the side walls, bottom and top wall and end-closing pieces of the conduit, substantially as and for the purposes set forth.

7. The combination with a sectional conduit comprising metal parts which form the sides, bottom and end closing parts thereof with the joints of the same water-tight, metal pieces forming the top portion of the conduit and holding with the metallic side pieces of the same and having their joints with each other and the side pieces of the conduit water-tight, and a series of surface conductors secured with said top portions of the conduit, with insulating substances between the adjoining ends of said surface conductors and the metal of said top portions and calculated each to conduct an electric current from a conductor within the conduit to one outside the same, or the reverse, of a jointed conductor contained within the chamber of the conduit and out of contact with the said surface conductors when in normal situation, yet adapted to be moved at will into an electrical connection with any one or more of said surface conductors, and away from the same, substantially as and for the purposes set forth.

8. The combination with a water-tight rail-form metallic conduit, comprising rail-form pieces of equal length which close the sides and bottom of said conduit, end-closing pieces provided with a perforation for passage of electric conductor from within the conduit out through the same, a top-closing wall of metal and short surface electric conductors in a series extending the whole length of the conduit and secured with the top-closing wall with an insulating-packing between their adjoining ends and between them and the metal of said top-closing wall, all secured together and constituting a portable electric conduit adapted to be handled and laid as a whole, of a jointed working electric conductor contained within the chamber of the conduit and having its terminal ends secured in the perforations provided in the said end-closing pieces, and mechanism for carrying, at will, portions of said jointed conductor into electrical connection with one or more of the surface conductors, substantially as and for the purposes set forth.

9. The combination with a completed water-tight portable rail-form metallic conduit which comprises side, bottom and top walls and end walls secured together, the end walls being each perforated for passage of a terminal of a working conductor, and a series of separated surface electric conductors which are consecutively secured with a side wall portion thereof and are insulated for electrical separation of each from the other and from the metal of said wall portion and adapted each to have an electric connection with an electric conductor which may be externally applied thereto at will, of a jointed conductor contained within the conduit and mechanism adapted to be operated at will, for electrically connecting one or more portions of said jointed conductor with adjoining surface conductors, by means of devices operated from the outside of the conduit, substantially as and for the purposes set forth.

10. The combination with a metallic side or wall portion of a completely-closed and water-tight portable conduit, of a series of separated surface electric conductors secured to said wall portion and insulated from the metal of the same, a jointed working conductor contained within the conduit and a jointed bed supporting said jointed working conductor at a short distance from the said surface conductors and adapted to move any portion of said working conductor into electrical connection with such surface conductor as may be opposite when a corresponding portion of said jointed bed is arbitrarily moved toward a surface conductor, of the series, by means of mechanism which is operated from without the conduit, substantially as and for the purposes set forth.

11. The combination with a closed conduit having a side portion thereof of metal which is calculated to permit a magnetic current to have passage through it, a series of surface conductors secured with said side portion and separated therefrom and from each other by a non-conducting substance and a jointed live or working conductor in situation out of electrical connection with the surface conductors, of a jointed bed of metal, with a conductor of magnetic currents, supporting the jointed working conductor within the conduit and devices calculated to be operated at will for moving the said bed toward the side of the conduit with which the surface conductors are provided, substantially as and for the purposes set forth.

12. The combination with a closed conduit having a side portion thereof of metal which permits a magnetic current to readily pass through it to an armature beneath, a series of surface conductors secured on the said metal side and insulated from the same by a non-conducting substance, a jointed live or working conductor contained within the conduit, and a jointed metal bed supporting said jointed conductor and adapted to act as an armature of a magnet and be moved toward the said metal side portion of the conduit for carrying the sections of the jointed working conductor into electrical connection with said surface conductors, of a magnet applied to the said metal side of the conduit and attracting the jointed metal bed toward its poles, substantially as and for the purposes set forth.

13. The combination with a closed conduit having a metal side portion which permits a magnetic current to readily pass through it, a series of surface conductors secured to said metal side portion and insulated therefrom, and a series of jointed bed-sections of which any one or more are adapted to be moved toward the surface conductors and also to serve as an armature, and contained wholly within the conduit, of a working conductor comprising a series of jointed sections of metal, of good conductivity, supported on the jointed bed-sections with any one or more thereof adapted to be moved into electrical connection with such surface conductors toward which any one or more of the jointed bed-sections may be moved, and devices adapted to be operated at will for moving one or more of the jointed bed-sections toward the said surface conductors, substantially as and for the purposes set forth.

14. An electric-conduit line formed by the combination of two or more completed similar portable and tight-closed electric conduits having each its end-closing pieces perforated, for passage of an electric conductor, and having each, throughout its entire length, a closing wall portion of metal which permits the passage of a magnetic current and is provided with a series of insulated surface conductors—each conduit, in the combination, containing within its tight-closed chamber a jointed working conductor and a jointed bed which is adapted to be moved, by the operation of a magnet, toward the said surface conductors, and carry one or more of the sections of said jointed working conductor into electrical connection with the same—of an electric conductor introduced into the perforations in the adjoining end pieces of each two adjoining portable electric conduits, thereby producing an electrical continuity of all the jointed working conductors in the several conduits in the said electrical conduit-line, substantially as and for the purposes set forth.

15. An electric-conduit line formed by the combination of two or more similar portable tight-closed electric conduits having in each end a closing-piece which is perforated for passage of an electrical conductor, and having each throughout its length a wall of metal through which a magnetic current may pass, and having with said wall a series of insulated surface conductors, each said portable conduit in the conduit-line having within its chamber a working conductor, comprising a series of jointed sections, and also a bed comprising a series of jointed sections of which any one or more is adapted to be attracted by magnetic force toward a surface conductor opposite thereto, and carry one or more of the sections of the working conductor thereon into electrical connection with corresponding surface conductors, and in combination with the same, an electrical conductor passing through the perforations in the adjoining end pieces of each two adjoining portable electric conduits and electrically connecting with the terminals of the working conductor in each adjoining conduit so that each jointed section in the electrically-joined working conductors of the combined conduits in the line may be in electrical connection with all the others in the working line, and mechanism operated at will by which any preferred one or more of the jointed sections of the working conductor may be moved into electrical connection with corresponding surface conductors, in the line, substantially as and for the purposes set forth.

16. In a tight-walled electric conduit, the combination with a return-circuit line conductor contained within the conduit, of externally-arranged electric conductors which form essential parts of the conduit and are adapted to receive a return electric current, from a device or thing previously operated by the current, through mechanisms in electrical connection with the outer sides of said electric conductors, and internal electric conductor or conductors between said externally-arranged electric conductors and said return-circuit line conductor and adapted to have an electrical connection with each, whereby the current operating the device or thing, may be returned to the source of the current by the way of the said return-circuit line conductor, substantially as and for the purposes set forth.

17. In an electric conduit, the combination with a closing-wall thereof of metal which is a conductor of electricity, an insulating substance between the said closing-wall and the side walls of the conduit with which the former is secured, a series of surface conductors securely connected with said closing-wall and insulated from electrical contact with the metal thereof, of a return-circuit line conductor contained within the chamber of the conduit, and interior electrical conductors which are in electrical connection with both the said return-circuit line conductors and the metal of said closing-wall which has secured with it the said surface conductors, whereby the metal of said closing-wall may be adapted to serve as a conductor between an electric conductor of a return-current, (when externally applied to said closing-wall) and said return-circuit line conductor, substantially as and for the purposes set forth.

18. In an electric conduit, the combination with a closing-wall thereof of metal which is a conductor of electricity, an insulating substance between the said closing-wall and the side walls of the conduit with which the former is secured, a series of surface conductors securely connected with said closing-wall and insulated from electrical contact with the metal thereof, of a jointed working conductor, uniformly supported within the closed chamber of the conduit and out of electrical connection with the inner surfaces of all the said surface conductors, yet adapted to have any of its portions moved, at will, into electrical connection with corresponding surface conductors opposite, a return-circuit line conductor also supported within the conduit and out of electrical connection with the side or bottom walls of the conduit, and electric conductors also contained within the conduit and having electric connections with electric conductors which are adapted to receive, by the way of their exterior surfaces, the electric current when being returned from the device or thing, previously operated by a current before cut out from the jointed working conductor, substantially as and for the purposes set forth.

19. In an electric conduit, the combination with a closing-wall, thereof, of metal which is a conductor of electricity, an insulating substance in the joints between said closing-wall and the metal side pieces of the conduit, a series of surface conductors secured within the said closing-wall and insulated therefrom, and a jointed working conductor contained within the chamber of the conduit and adapted to have any of its portions moved, at will, into electrical connection with corresponding surface conductors which may be opposite, of a return-circuit line conductor also contained within the conduit and a series of interior side electric conductors which are in electrical connection with both the return-circuit line conductor and the said closing-wall bearing the said surface conductors, and insulating substances between said interior side return-conductors and the adjoining side walls of the conduit, substantially as and for the purposes set forth.

20. In a close-walled electric conduit, the combination with a closing-wall portion thereof which is a conductor of electricity and adapted to receive by the way of its exterior side a return electrical current from a device or thing which may have been previously operated by the current, and a return-circuit line conductor contained within the chamber of the conduit, of suitable return electric conductors also contained within the chamber of the conduit and having electrical connection with both the said electric conducting closing-wall portion and said return-circuit line conductor, substantially as and for the purposes set forth.

21. In an electric-conduit line comprising a series of similarly-constructed portable and close-walled electric conduits, having, each, its ends closed by an end-closing piece which is perforated to adapt it to receive an electric conductor, and having each a similar closing-wall portion of metal which is adapted to serve as an electric conductor, and each containing a similar return-circuit line conductor and similar suitable conductors which are at all times in electrical connection with both the said closing-wall portion of the conduit and said return-circuit line conductor, and in combination with said conduits, of the series, a series of electric conductors, comprising one between the adjoining end-closing pieces of each two adjoining conduits, each said conductor having its end portions thereof passing through the perforations provided in the adjoining end-closing piece and having electrical connection with the end portions of the return-circuit line conductor terminating at each end-closing piece, whereby all the return-circuit line conductors in the conduit-line may be electrically connected and adapted to return electric currents, entering any of the conduits by the way of its closing-wall portion, to the source of supply of the current, substantially as and for the purposes set forth.

22. In a close-walled portable conduit having with a side wall thereof a series of surface conductors which are each insulated from contact with the said wall and calculated each to serve as a conductor of an electric current to an exterior conductor, arbitrarily connected with it and in electrical connection with the same, and with a jointed working conductor also contained within the conduit and adjoining said surface conductors, yet not electrically connected therewith, and devices adapted to move any portion of said jointed working conductor into electrical connection with some one or more of said surface conductors, of a distance-supply conductor also contained within said conduit and extending from end to end thereof with its terminals adapted to be electrically connected with terminals of similar distance-supply conductors which may be contained within similarly constructed and equipped electric conduits adjoining and connecting thereto, in an electric-conduit line, with each terminal also adapted to be electrically connected—when required—with a terminal of a second or other working conductor which may have its beginning in a distant similar conduit, substantially as and for the purposes set forth.

23. In an electric-conduit line which comprises a series of close-walled portable conduits having each similar inclosing sides and bottom and end walls and a top-closing wall which has with it a series of surface conductors which are insulated from contact with said top-closing wall, and containing within its chamber a jointed working conductor adapted to have portions thereof arbitrarily moved into electrical connection with corresponding surface conductors which may be opposite, a return-circuit line conductor which is electrically connected with the top-closing wall of the conductor, and one or more distance-supply conductors which are insulated from each other and from metal pieces adjoining them, said jointed working conductors, return-circuit line conductor and distance-supply conductors, in each conduit, being each electrically connected with the adjoining corresponding similar conductor in adjoining conduits, with the distant terminals of the connected series of jointed working conductors, in the line of joined conduits, suitably connected with the return-circuit line conductor opposite said terminal, while the distant terminal of the distance-supply conductor is electrically connected with the beginning end of a second or other series of jointed working conductors contained within another similar conduit-line, and the distant terminal of the return-circuit line conductor is in suitable electrical connection with the beginning end of a similar conductor in the similar conduit-line, substantially as and for the purposes set forth.

24. In a conduit-line comprising a series of close-walled portable electric conduits, each provided with the several kinds of conductors described and respectively connected, kind with kind, throughout one series of conduits in the line, the combination with a beginning section, of a second or other series of jointed working conductors, which is contained within a distant conduit which is the first of a second or other series of electric conduits in the line, and the terminal portion of a distance-supply conductor which is contained within the last one of the first or preceding series of conduits, in the conduit-line, of an electric conductor between the said terminal portion of the distance-supply conductor and said beginning section of the second or other succeeding series of the jointed working conductors in the second or other series of conduits in said conduit-line, substantially as and for the purposes set forth.

25. In a portable close-walled conduit having end-closing pieces which are suitably perforated for receiving a terminal portion of an electric conductor contained within the conduit and extending from end to end thereof, the combination with said perforated end-closing pieces, of the said terminal portions of such an electric conductor passed through said perforations and having their outer ends turned against the outer side of each said end-closing piece, substantially as and for the purposes set forth.

26. In a conduit-line comprising two or more portable close-walled conduits, each containing within its chamber one or more electric conductors which extend from end to end of each said conduit and having their terminal portions insulated and passed through suitable perforations provided in the respective end-closing pieces of each adjoining conduit and turned against the outer sides of the said end pieces, of a keying-piece of good conductivity having opposite half portions which are entered respectively in the perforation of each adjoining end-closing piece and applied to the adjoining conductor-terminals secured therein, whereby each conductor in each conduit may be electrically connected with its adjoining similar conductor contained within an adjoining conduit, substantially as and for the purposes set forth.

27. In an electric-conduit line comprising a series of close-walled portable conduits which are successively joined together by suitable devices, and in combination with the same and a series of surface conductors which are secured successively with the top-closing walls, also of good conductivity, of the conduits in the line, of a continuously-connected jointed working conductor contained within the joined conduits, a return-circuit line conductor also having an electrical continuity and contained within said conduits, and a series of side electric conductors also within the several conduits of the line and in electrical connection with the top-closing walls of the respective conduits in the line and the said return-circuit line conductors, substantially as and for the purposes set forth.

28. In an electric-conduit line, the combination with side and bottom walls and a top-closing wall of short sections of metal through which both magnetic and electric currents may freely pass, water-resisting packing in the joints of said walls, and a series of short surface conductors secured with the respective sections of the said top-closing wall, and insulating substances between said surface conductors and said sections of the top-closing wall, of two or more series of jointed working conductors contained within the conduit-line, a corresponding series of jointed beds, each supporting a jointed working conductor and adapted to be moved toward the sectional top-closing wall and carry portions of the working conductors into electrical connection with corresponding surface conductors opposite, one or more distance-supply conductors also contained within the conduit, an electric conductor between the distant terminal of the first distance-supply conductor and the starting end portion of the second jointed working conductor in the series of working conductors, a similar electric conductor between the distant terminal of each succeeding distance-supply conductor and the respective starting end portion of each succeeding working conductor, a return-circuit line conductor extending in electrical continuity from one end of the conduit-line to the other, and return side electric conductors in electric connection with the sections of the top-closing walls of the conduit-line and the return-circuit line conductor, substantially as and for the purposes set forth.

ALEXANDER SELKIRK.

Witnesses:
A. SELKIRK, Jr.,
CHARLES SELKIRK.